April 28, 1942.  F. J. JOHNS  2,280,914
TEMPERATURE PROTECTION FOR INDUSTRIAL MOTORS
Filed March 4, 1939  3 Sheets-Sheet 1
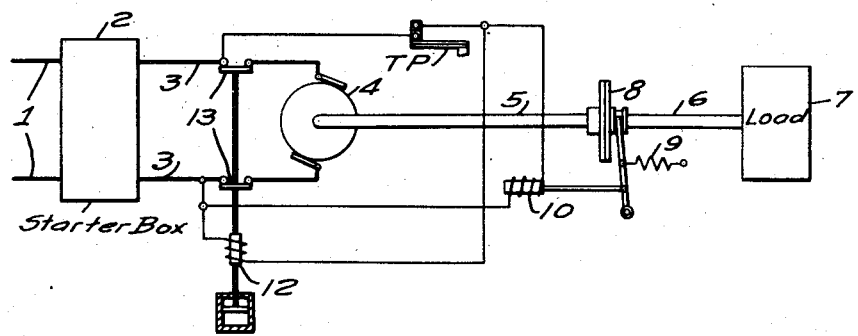
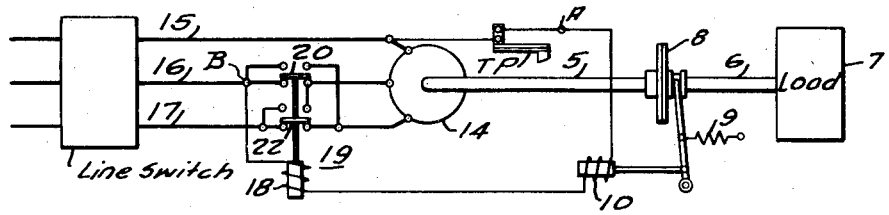
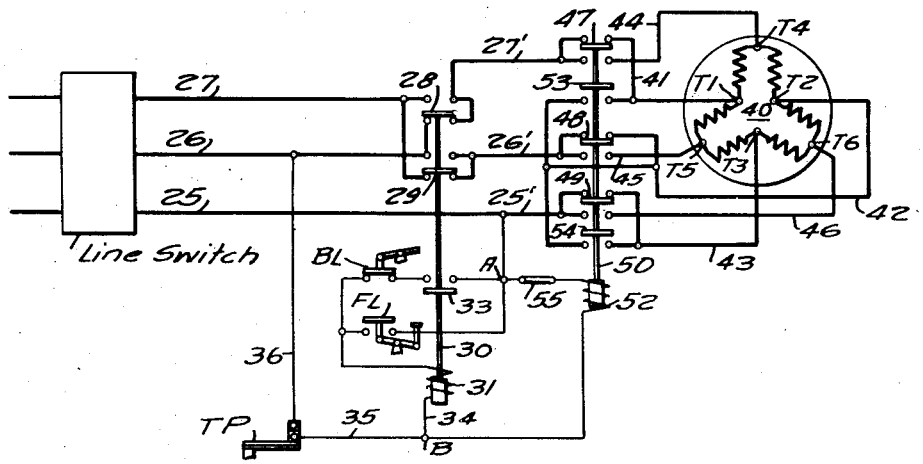
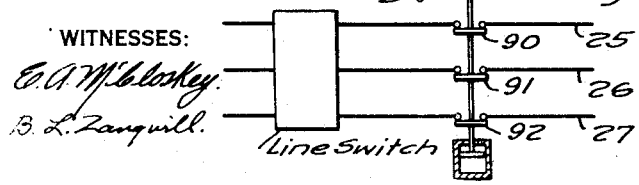
INVENTOR
Francis J. Johns.
ATTORNEY April 28, 1942. F. J. JOHNS 2,280,914
TEMPERATURE PROTECTION FOR INDUSTRIAL MOTORS
Filed March 4, 1939  3 Sheets-Sheet 2
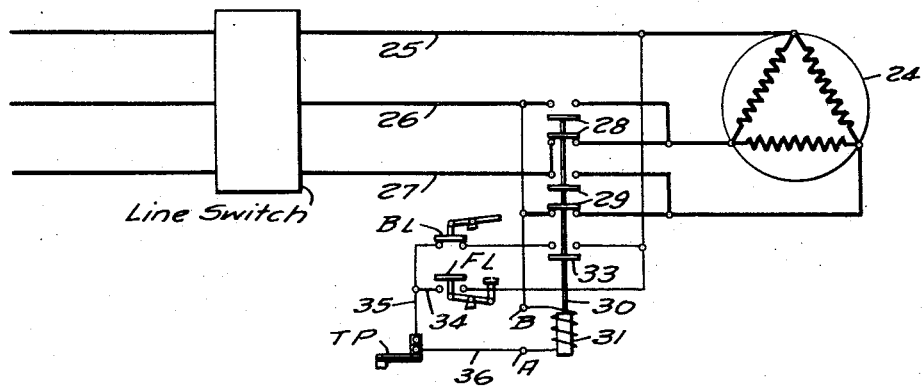
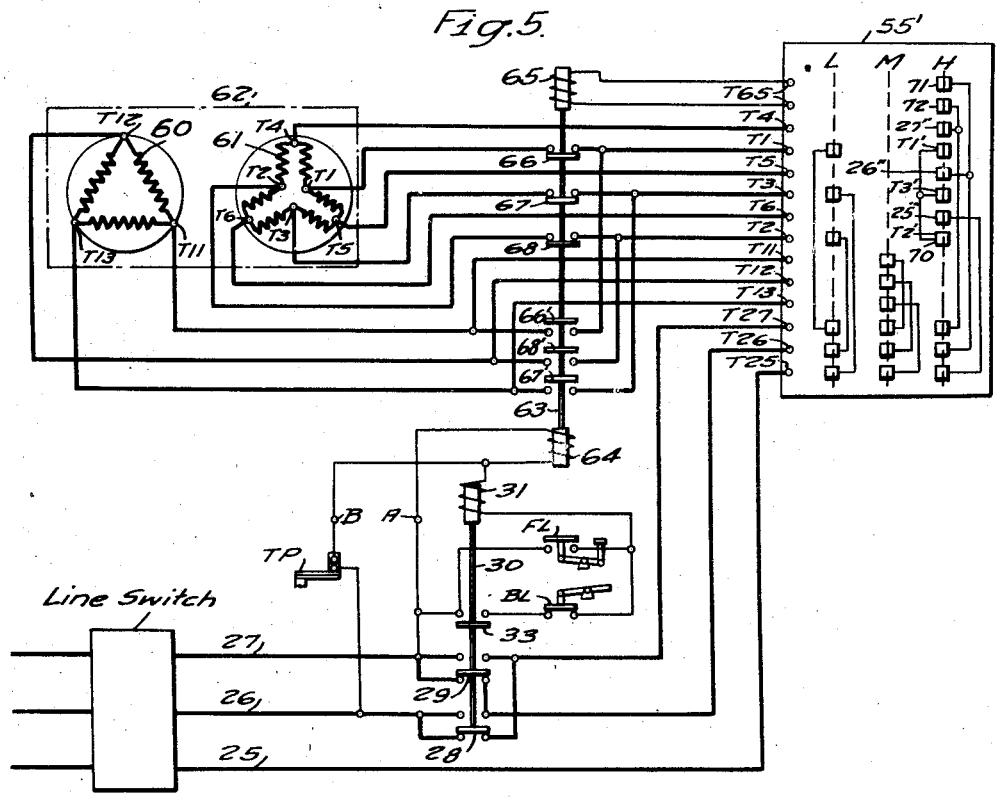
WITNESSES:
INVENTOR
Francis J. Johns.
BY
ATTORNEY

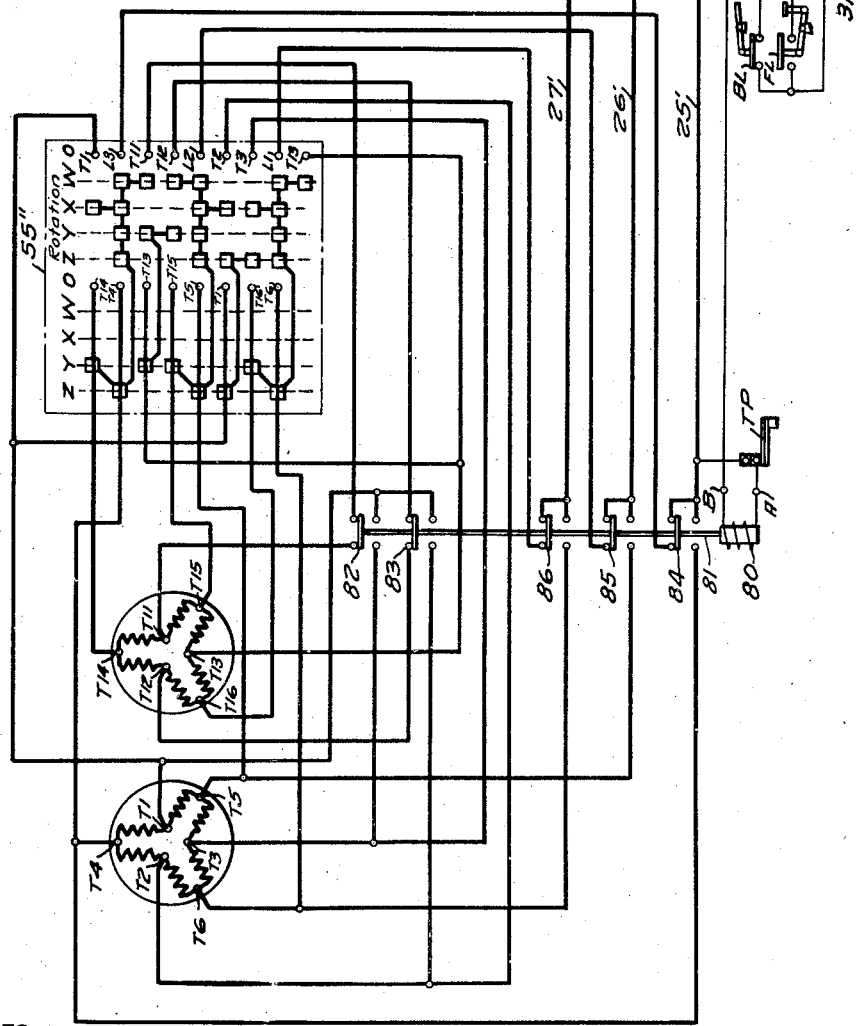

Patented Apr. 28, 1942

2,280,914

UNITED STATES PATENT OFFICE 2,280,914

TEMPERATURE PROTECTION FOR INDUSTRIAL MOTORS

Francis J. Johns, Pittsburgh, Pa., assignor to Westinghouse Electric & Manufacturing Company, East Pittsburgh, Pa., a corporation of Pennsylvania Application March 4, 1939, Serial No. 259,827

36 Claims. (Cl. 172—239)

Electric motors have long been protected against overheating from one cause or another, and many different systems for such thermal protection are known, of which the patents to D. E. Renshaw et al., C. G. Veinott and C. R. Boothby, No. 1,930,539, of October 17, 1933; No. 1,987,725 of January 15, 1935; and No. 1,997,673, of April 16, 1935, respectively, are examples. In these systems, as well as all others of which I am aware, temperature responsive means, generally in the form of a thermostatic switch, is employed to disconnect the energy supplied to the motor until the protected motor cools sufficiently so that the temperature responsive means re-establishes the energizing circuit. My invention relates generally to such systems in that I decrease the time required to cool the protected motor to the point where it again can be operated under loaded conditions.

My invention relates to the running of motors protected against overheating, preferably by some means or thermal device responsive to the temperature of the motor or responsive to the heating of some particular part thereof.

My invention is broadly applicable to any suitable thermally-protected motor, but is especially useful for motors driving certain machine tools operating through a working stroke and a return non-working stroke, as, for example, a drill press whereby the motor rotates a spindle in one direction while a hole is being drilled, or tapped or some other similar operation performed, and rotates the spindle in the opposite direction to withdraw the working tool, the motor continuing to rotate even though the extreme position of the tool has been reached. Generally, tool or work-travel limit switches, with or without timed sequence control apparatus, control the direction of rotation of the motor.

In prior structures, when the motor is worked too hard and parts thereof become overheated, the thermal responsive means usually associated with the motor becomes operative to disconnect the circuit supplying electrical energy to the motor. The motor stops and cannot be operated again until the temperature has dropped sufficiently to cause the thermal responsive means to reclose the motor energizing circuit.

However, the period during which the motor is stopped for cooling to the proper extent is relatively long, and, as a matter of fact, the temperature of portions of the motor may actually increase for a while immediately after the motor is disconnected before cooling actually begins. This long period in which the motor is idle obviously involves economic loss and, in many instances which are all too common, impatient operators may short or disconnect the temperature responsive means protecting the motor and continue to operate the motor in overheated condition until the motor finally burns out.

It is a primary object of my invention to decrease the cooling time on the thermally protected motor so that the periods of idleness after the operation of a thermal protective means will be decreased.

In accordance with my invention, I do not necessarily disconnect the electrical energy from the motor upon operation of the thermal protective means when a predetermined overheat temperature is reached, but, rather, cause the motor to run substantially, meaning that the load on the motor is sufficiently decreased so that heat-generation, due to loaded conditions of the motor, is materially decreased unloaded. In this way the self-ventilation of the motor due to its rotation is continued, but the major causes of heat generation are eliminated, and the result is a cooling of the motor to the point where the thermal protective means can restore normal motor operating conditions far more rapidly than if the motor were permitted to stand idle.

The general principles of my invention, as aforesaid, are adaptable to substantially any type of motor, and to those which rotate only in one direction, or are capable of rotating in two directions. The specific manner in which the principles of my invention are applied to a motor, obviously, will depend upon the type of motor, whether it be direct current or alternating current, and whether it be single-speed or multi-speed, and, perhaps, upon other operating characteristics of the motor.

In general, a motor rotating in a single direction and capable of having its load disconnected has the thermal protective means operate the disconnecting means without disturbing the energizing circuit to the motor; or if the motor is applied to a machine tool of the type previously described, and is capable of rotating in either of two directions, in one of which it is loaded and the other of which it is not loaded, the thermal protective means of my invention causes the motor to rotate in the unloaded direction when the predetermined temperature of the motor, or its parts, is reached. Where the motor is of the multi-speed type, it is a purpose of my invention to run the motor unloaded, but at the higher speed so that it cools more rapidly, and this feature of my invention is applicable either to motors rotating in a single direction or in two directions.

In multi-speed motors either manually or automatically operated controllers usually select the operating speed of the motor, and it is within the province of my invention to thermally protect motors of this character in accordance with the teachings of this disclosure.

Many other objects, features, and combinations of my invention will be apparent from the following description thereof taken in conjunction with the attached symbolic drawings, in which like reference numerals apply to like parts, and in which:

Figure 1 is a wiring diagram generally indicative of the teachings of my invention as applied to a motor rotatable in a single direction;

Fig. 2 is a wiring diagram showing the teachings of my invention applied to a specific type of motor, namely, a three-phase, single-speed, reversible, induction motor which drives a load shaft in a single direction through a clutching means;

Fig. 3 is a wiring diagram of a specific form of my invention applied to a three-phase, single-speed, reversible, induction motor driving a machine tool of the type previously described, namely, a machine tool which undergoes a working stroke or operation with the motor running in one direction, but a tool withdrawing or non-working operation, or both, when the motor runs in the opposite direction, the motor running idle after the working tool has been withdrawn;

Fig. 4 is a wiring diagram of a specific application of my invention to another form of motor for driving a machine tool as aforesaid, but in this instance the motor is a multi-speed motor having manually-operable means for selecting the speed at which the motor will run;

Fig. 5 is a wiring diagram of another specific application of my invention to a three-speed induction motor for driving a machine tool of a type previously described;

Fig. 6 is a wiring diagram of still another specific application of my invention to a four-speed induction motor for driving a machine tool such as previously described;

Fig. 7 is a wiring diagram of a feature of my invention for disconnecting the motor entirely from the power lines, and which can be applied to any diagram of the embodiments of Figs 2 through 6; and Fig. 8 is a chart indicating the connections to the terminals of the motor of Fig. 6 for obtaining different speeds of rotation.

Referring more particularly to Fig. 1, I have shown a main source of supply 1 leading to a line starter box 2 interposed in power lead connections 3 to a motor 4. The motor has a shaft 5 coupled to a shaft 6 having a load 7, the coupling being effected through the medium of an electromagnetic clutch 8 which may be disengaged by the pull of a spring 9, and engaged by energization of a coil 10.

The coil 10 is connected in series with a thermal responsive means TP which may be, for example, any suitable thermostatic switch, and both are energized from any suitable source of power and shown in this instance as across a pair of the power leads 3. As an additional feature of my invention, a time-delay relay 12 having contactors 13 in the motor supply power leads 3 is connected in parallel with the coil 10, and is, therefore, also controlled by the temperature responsive means TP.

The temperature responsive means TP usually comprises a thermostatic switch or equivalent device mounted upon, or somewhere within, the motor to be responsive to temperature rises at the place at which it is mounted, as more particularly shown and described in the patents identified previously, as examples. The particular temperature responsive means, or the manner in which it is made responsive to a temperature factor of the motor forms no part of my invention, except as it is combined in the protective system, and described and used in accordance with the principles of my teachings.

Whatever the location and construction of the temperature responsive means, it is such that it opens or closes, as the case may be, a circuit, but in my particular embodiments I show the temperature responsive means as normally closing a circuit while the motor is operating under satisfactory temperature conditions. The circuit is opened by the temperature responsive means whenever an undesirable or predetermined temperature is attained.

Assuming the circuits in the condition shown in Fig. 1 and the motor 4 operating, the coil 10 is energized through an obvious circuit involving the power leads 3, the temperature responsive means TP, and the coil 10. The coil 10, therefore, maintains the clutch 8 closed, so that the motor drives the load 7. If, now, the temperature responsive means TP should become heated to the point at which it opens the circuit in which it is connected, the coil 10 will be deenergized and the clutch 8 will operate to disconnect the driving power of the shaft 5 from the shaft 6. Accordingly, the motor 4 will continue to operate, but in unloaded condition, since the clutch 8 is now in disengaging position.

Since the motor continues to revolve, its windage, and perhaps self-ventilation if it be provided with a fan, ventilates the motor so that it will cool far more rapidly than if the motor had been disconnected and allowed to stand idle, in which case the cooling would have to be primarily by convection in substantially quiescent air, and somewhat by radiation.

The time-delay relay 12, with its contactors 13, is an added protective feature to disconnect the motor 4 in the event that the motor does not cool within the time desired. The relay 12 is of the type which instantaneously attracts its contactors 13 upon energization, but releases them slowly when the relay is deenergized. Accordingly, if the temperature responsive means TP should remain open for some reason beyond the time it normally should and for a time sufficient to permit the deenergized relay 12 to release its contactors 13, the motor 4 will be disconnected from the energizing lines 3. In this way, complete protection is provided for the motor 4 in the event that the heating within the motor occurs from some source, say, a short within the motor, rather than from overloading.

It may be observed in Fig. 1, that, first, my invention involves permitting the motor to run unloaded in the event that it becomes overheated, and secondly, disconnecting the motor energizing circuit in the event that the motor does not cool while running unloaded. In the subsequent embodiments the protective feature of the relay 12 is omitted for the purpose of simplicity, but it is obvious that it can be added by any one skilled in the art to the embodiments to be now described.

The embodiment of Fig. 2 is specifically applicable to a single-speed, reversible, three-phase, induction motor driving a load 7 permanently connected to the shaft 6, as in the embodiment of Fig. 1. The induction motor, represented by the numeral 14, is supplied with power by the three-phase leads 15, 16 and 17 and across two of these leads, namely, 15 and 16, is a series circuit including the temperature responsive mean TP, the clutch-engaging coil 10, and a coil 18 of a relay 19 having a pair of contactors 20 and 22 connected in the leads 16 and 17 for reversing the motor in a manner well known to the art.

In the operation of this embodiment, when the thermal responsive means TP functions as indicative of undue heating of the motor, the coil 10 is deenergized, permitting the spring 9 to declutch the clutch 8, as in the previous embodiment, and permitting the motor 14 to run idle. However, the coil 18 is also deenergized so that the contractor 20 previously in the phase line 16 is released to a circuit-closing position in the phase line 17, while the contactor 22 previously in the phase line 17 is released to a circuit-closing position in the phase line 16. Accordingly, the contractors 20 and 22 reverse two of the supply phases to the motor 14 and the motor will run idle in a direction reverse to the loaded direction. The motor normally will rapidly cool if run idly at full speed, and when the motor, or its protected parts, cools sufficiently to permit the temperature responsive means TP to reclose, the coil 18 will be reenergized to reverse the phases 16 and 17 and thereby cause the motor 14 to rotate in the proper loaded direction, while the coil 10 will also be energized to clutch the load to the drive shaft 5 of the motor.

The embodiments of Figs. 1 and 2 show generally the application of my invention to motors driving loads which require the driven load shaft to rotate in the single direction, but in Fig. 3 and in the remaining embodiments, I show the principles of my invention applied more specifically to different types of induction motors for driving machine tools in which the motor rotates in one direction for a working operation of the tool, and rotates in the reverse or opposite direction for a tool restoring or non-working stroke of which the aforesaid drill press may be deemed an example. In addition, I show the principles of my invention adapted to a machine tool of this type having travel-limit switches.

The motor of Fig. 3 is specifically a reversible three-phase induction motor operable at a single speed, and by speed I, of course, do not confine myself to an exact number of revolutions, since, as is well known, the actual speed of an induction motor depends upon its load and design characteristics. By "speed" I may more generally include the operating speed for a motor under a particular connection.

In Fig. 3 the motor 24 is supplied with energy by the three phase lines 25, 26 and 27 with any two of the lines, shown as 26 and 27, having phase-reversing contractors 28 and 29 as part of a relay 30 having an operating coil 31. Assuming the motor has just been started and relay 30 to be deenergized, the contactors 28 and 29 will be in the lowermost position. The motor will accordingly run in a single direction which may be assumed to be the unloaded direction. Since the motor has just been started, it can be assumed to be cool, so that the temperature responsive means TP is in circuit-closing position, but it may be observed that the circuit to the coil 31 is not complete, being open at a normally open forward limit switch FL and at a contactor 33 of the relay 30. If, now, the forward limit switch FL is momentarily closed, a circuit is completed from the line 25 through the now closed switch FL, through a wire 34, a wire 35, the thermal responsive means TP in the form of a thermostatic switch, through wire 36, and coil 31 of relay 30 to the other supply line 26. The relay 30 is now energized so that its contactors 28 and 29 reverse the phase lines 26 and 27 to the motor 24, and the motor will rotate in a direction in which it supplies power to drive the machine tool forward through its working stroke.

The relay 30 is locked by means of its holding contactor 33 through a holding circuit including the supply line 25, the now-closed contactor 33, the normally-closed back limit switch BL, the wire 35, the closed temperature responsive means TP, the wire 36, and the coil 31 to the supply lead 26 so that the forward limit switch FL can be permitted to restore to its normally-open position. Accordingly, contactors 28 and 29 are maintained in their upper position, with reference to Fig. 3, and the motor continues to drive the machine tool through its operating stroke until either the tool, or some other factor responsive to the operating stroke of the machine tool, opens the back limit switch BL whereupon the holding circuit of the coil 31 is opened and the contactors 28, 29, and 33 drop.

The contactors 28 and 29 now cause the motor to operate in its reverse or the tool-non-working direction, while the contactor 33 prevents reenergization of the coil 31 when the back limit switch BL restores to normally-closed position. The motor will continue to run to the end of the non-working stroke, and will still continue to run until the forward limit switch is again momentarily closed to cause a repetition of the sequence of operations just described.

From this sequence of operations, it is obvious that motor 24 can drive the machine tool to which it is connected through the medium of the control switches FL and BL, and these control switches are of the semi-automatic type in this instance, that is, the switch FL is normally opened, but is capable of being manually closed to start the operation of the machine tool in its working stroke, and at the end of the working stroke the back limit switch BL, which is normally closed, is opened to cause a reversal of the direction of rotation of the motor until the machine tool is restored to its original position ready for a second operating stroke upon closure of the forward limit switch FL.

If, however, the motor should heat up until the temperature responsive means TP operates, the circuit between the wires 35 and 36 will be opened, and it is manifest that any further closure of the switch FL will have no effect upon the motor, since the coil 31 cannot be energized due to the fact that its energizing circuit is now opened between the wires 35 and 36. Accordingly, regardless of the position of the machine tool at the time the switch TP opens, it will operate in unloaded condition due to the dropping of the contactors 28 and 29 which connect the two phase lines 26 and 27 to the motor in such manner that it rotates in the direction selected as the unloaded condition. The motor, of course, will continue to operate unloaded, and closing of the switch FL cannot cause it to rotate in the loaded direction so long as the thermal responsive means TP is in circuit-opening position. However, since the motor continues to rotate in the unloaded condition, it will cool within a much shorter interval of time than if it were permitted to cool while standing idle, and before long the temperature responsive means TP will reclose the circuit between the wires 35 and 36, and the motor 24 will be restored to production operation. At this instant, of course, the unloaded condition of the motor is in comparison with the loaded condition, since the motor might have a slight load as in the case with a continuously rotating drill press with the drill out of the work.

Fig. 4 shows my invention applied to still another embodiment involving a two-speed reversible induction motor having a so-called series-delta, parallel-star winding 40 with terminals T1, T2, T3, T4, T5 and T6. each having lead connections 41, 42, 43, 44, 45 and 46, respectively. As is well known with motors of this type, the motor will operate at one speed if the terminals T1, T2 and T3 are connected to the power lines 25, 26 and 27, and at a second and higher speed when the terminals T4, T5, and T6 are connected to the power lines. In the former instance, it is preferable to leave the terminals T4, T5 and T6 unconnected, while in the latter instance, it is preferable to short the terminals T1, T2 and T3.

In order to change the speed of the motor, contactors 47, 48 and 49 are provided in the power supply connections to the motor, and are a part of a relay 50 having an operating coil 52. Assuming energy is supplied to the power lines 25', 26' and 27', it is obvious that with the aforesaid contactors in their upper positions, the connections 41, 42 and 43 to the terminals T1, T2 and T3, respectively, will be energized to cause the motor to rotate at the lower value of speed, the connections 44, 45 and 46, respectively, being open. If it is desired to run the motor at the higher speed, the contactors 47, 48 and 49 are permitted to drop whereupon power is removed from the connections 41, 42 and 43 and applied to the connections 44, 45 and 46. The motor will now be energized in parallel-star and will operate at the higher speed. When it is desired to short the terminals T1, T2 and T3 while the motor runs at the higher speed, contactors 53 and 54 may be added to the relay 50, these contactors, in their down position, connecting together the leads 41, 42 and 43 from the terminals T1, T2 and T3.

The relay 50, therefore, controls the speed of the motor and by either energizing its coil 52 or deenergizing it, the operating speed of the motor can be selected. To effect this selection a manually-operable switch controller 55 is inserted in series with the coil 52, and assuming that the energizing circuit for this coil to be otherwise complete, operation of the switch controller 55 obviously will control the speed at which the motor will operate.

The motor of this embodiment is protected by the temperature responsive means TP which controls the circuit to the motor-reversing relay 30 having an operating coil 31, phase-reversing contactors 28 and 29 and holding-circuit contactor 33, similar in all respects to the like parts of Fig. 3, with the holding contactor 33 in series with limit switch BL and both in parallel with the forward limit switch FL. However, in this embodiment the relay 50 has its operating coil 52 also controlled by the temperature responsive means TP which is in series therewith in a circuit traced as follows: From the power line 25 to the switch controller 55, the coil 52, and thermostatic switch TP, back to the other power line 26.

Assuming the parts in the position shown in Fig. 4 and with the switch controller 55 closed, the motor normally will operate with the terminals T1, T2 and T3 connected to the power lines and also will rotate at the lower of its two operating speeds. It will be reversed, of course, and will operate in either of two directions at this speed in accordance with the operation of the switches FL and BL as previously described. If it is desired to operate the motor normally at the higher speed, it is only necessary to open the switch 55 whereupon the terminals T4, T5 and T6 are connected to the power supply, the operating direction of the motor being again controlled by the positions of the switches FL and BL, as aforesaid.

It is further obvious, that when the contactors 28 and 29 are in their lower position, the motor is operating in its unloaded condition, and that the contactors are in their raised position the motor is operating in the other, and loaded, direction. In other words, in order to have the motor operate in its unloaded direction, the contactors 28 and 29 must be in their lowermost position; and for the motor to operate in its loaded direction, the contactors 28 and 29 must be in their uppermost position with respect to Fig. 4.

It is manifest, therefore, that the relay 50 controls the speed at which the motor will operate, while the condition of the relay 31 and, therefore, the position of its contactors 28 and 29, controls the direction of rotation of the motor.

In accordance with this embodiment, however, the motor is protected in such manner that when a predetermined temperature is reached it will operate in the unloaded direction at the higher value of speed in order to assure its cooling rapidly. With the connections as shown which involves the control of the relay 50, as well as the control of the relay 30, by the temperature responsive means TP, opening of the temperature responsive means TP, due to overheating for any reason, will, as before, deenergize the operating coil 30 of the relay 31, causing the motor to rotate in its unloaded direction. In addition, the circuit-opening operation of the temperature responsive means TP deenergizes the operating coil 52 of the relay 50 causing its respective contactors to connect the power lines to the motor in such manner that it will rotate at its higher value of speed, the particular connections of which have already been described.

The features of this embodiment are similar to those of Fig. 3 in that after the temperature responsive means TP has operated to circuit-opening position, the motor can continue to operate only in the unloaded condition, but has the advantage that, in addition, it will rotate at its highest rated speed, so that the cooling will be affected quicker.

Fig. 5 shows still another embodiment of my invention applied to a two-winding, three-speed induction motor in which one of the windings is a series-delta, parallel-star connection. In this embodiment the relay 30 with its energizing coil 31 and contactors 28, 29 and 33, are connected as in the previous pertinent modifications with the contactors 28 and 29 capable of reversing the phase supply lines 26 and 27 to the motor, the contactor 33 in series with a back limit switch BL, and the forward limiting switch FL connected in parallel across the series connection of the switch BL and contactor 33. However, since the motor is a three-speed motor, provisions are made to select the operating speed of the motor in accordance with the particular work the motor is to perform. In this instance, a rotatable drum switch controller 55' of any suitable type is interposed between the motor and the supply leads 25, 26 and 27, but after the contactors 28 and 29, and distributes the supply lines to the various terminals of the windings 60 and 61 of the motor 62. The different terminals T1, T2, T3, T4, T5 and T6 of the winding 61 are connected to stationary brushes, correspondingly labeled, of the controller 55' while the terminals T11, T12 and T13 similarly are connected to stationary brushes, with the same legends, of the controller 55'.

The controller 55' has three positions L, M and H, respectively, indicative of low speed, medium speed and high speed connections for the motor 60. In the low speed position the power lines 25, 26 and 27 are connected to the terminals T1, T2 and T3; in the medium speed position the power lines are connected to terminals T11, T12 and T13; and in the high speed position the power lines are connected to the terminals T4, T5 and T6 with the terminals T1, T2 and T3 shorted through a connection in the controller 55'.

A relay 63 having two operating coils 64 and 65 controls the change over from the low speed to the high speed of the motor in the event that the thermal responsive means TP operates due to overheating. For the purpose the relay 63 is provided with contactors 66 and 66', 67 and 67', 68 and 68' respectively.

During normal operation of the motor, the controller switch 55' is positioned, usually manually, to cause the motor to rotate at the desired speed, and the motor will operate at this speed and reverse itself in accordance with the operation of the limit switches BL and FL, as in the two previously-described embodiments. During normal operation, of course, the thermal responsive means TP is in circuit-closing position, so that the relay 63 is maintained energized, and all the proper terminals of the motor are connected to the corresponding energized stationary brushes of the controller 55'. Accordingly, the speed of the motor can be selected for normal operation by merely twisting the controller to the desired one of its three positions.

Assuming now that the controller 55' is in its first or low speed position and the thermal protective means TP operates to open its circuit. The relay 30 will, obviously, be deenergized, causing the motor to rotate in its unloaded position as in the embodiments of Figs. 3 and 4. However, opening of the switch TP also deenergizes the coil 64 of the relay 63 causing the contactors 66, 67 and 68 to drop, whereupon the stationary brushes T1, T2 and T3, which are the only brushes energized in the low position of the controller, are disconnected from motor terminals T1, T2, T3, and are connected to the intermediate speed motor terminals T11, T12 and T13 via the contactors 66', 67' and 68'. Accordingly, the motor will now cool while rotating at the intermediate speed determined by the winding 60, all the other motor terminals T1, T2, T3, T4, T5 and T6 being open. It may be observed that in the low and medium speed positions of the controller 55', the second coil 65 of the relay 63 is not energized, inasmuch as its stationary brushes T65 do not contact any segments of the controller 55'.

If the motor had been operating with the controller in the intermediate speed position, the lines 25, 26 and 27 would be connected only to the terminals T11, T12 and T13 and upon operation of the temperature responsive means TP, only the direction of rotation of the motor would be affected so that it will run in the direction in which it is not loaded to any appreciable extent.

If the controller, however, were in its high speed position, the power from the stationary main line brushes T25, T26 and T27 would be directed to the segments 25'', 26'' and 27'', respectively, and thereby energize the stationary brushes T4, T5 and T6 so that power is conveyed to the terminals T4, T5 and T6 of the motor. In this high speed position of the controller 55' the segments T1', T2' and T3' are shorted by a conductor 70 so that they necessarily short the stationary brushes T1, T2 and T3, and the corresponding terminals T1, T2 and T3, resulting in the preferred connection for running a motor of the type described at high speed.

If the motor should become overheated in the high speed position of the controller 55', the temperature responsive means TP operates the relay 30 to cause the motor to rotate in the direction in which it is unloaded. However, it would also open the circuit to the coil 64 of the relay 63 and in view of the fact that the short-circuiting conductor 70 is across the brushes T1, T2 and T3, it is necessary to prevent dropping of the contactors 66, 67 and 68. Accordingly, the controller 55' is provided with an additional pair of segments 71 and 72 connected across a pair of power lines, and which contact the stationary brushes T65 in the high speed position of the controller whereby the alternative operating coil 65 of the relay 63 is maintained energized to hold the contactors 66, 66', 67, 67', 68 and 68' in their upper positions. Since the motor connections are now maintained for high speed rotation in the unloaded direction, the operation of the temperature responsive means TP will assure an adequate rapid cooling rate for the motor.

From the foregoing embodiments it is manifest that there are certain common principles by which the functions and purposes of my invention can be added to any ordinary motor, and it is further manifest that to describe all the different types of motors that exist to which my invention can be applied would vastly lengthen and expand this description. Accordingly, only one additional and somewhat more complex application of the principles of my invention will be described, but I desire it to be understood, as will be at once obvious to one skilled in the art, that my invention is not limited to the specific embodiments shown which are only for the purposes of illustrating the application of my invention.

Fig. 6 shows my invention applied to a double-winding, multi-speed, reversible, induction motor in which each of the windings is a series-delta, parallel-star winding. The power lines 25, 26 and 27, the phase-reversal contactors 28 and 29, the coil 30 and its contactor 33, and the limit switches BL and FL are similar in all respects to the embodiments of Figs. 3, 4 and 5, and generally comprise the feature of my invention which effects the motor upon operation of the temperature responsive means TP to compel the motor to rotate unloaded. In Figs. 3, 4, 5 and 6 this is accomplished by merely connecting the motor so that it rotates in the direction in which the machine tool to which it is applied is in a non-working condition, while, in Figs. 1 and 2, this is accomplished by declutching the motor from its load.

Referring particularly to the embodiments of Fig. 6, the drum speed controller 55'' in this instance has four positions in which the rotatable segments are indicated by squares and the stationary brushes contacting the various segments in the different positions are indicated by circles legended in accordance with the different terminals of the motor windings and to which they are normally connected. The different positions of the controller are indicated by the small letters $w$, $x$, $y$ and $z$, it being understood that the different stationary brushes contact the different segments horizontally aligned therewith at the different positions shown, and that the segments are inter-connected as shown.

Normally, with the temperature responsive means TP closed, the motor will operate at whatever speed is selected by the controller 55'' and will reverse its direction of rotation between loaded and unloaded conditions under control of the limit switches FL and BL as in the embodiment shown in Fig. 5. In the instant embodiment, the highest speed of the motor is obtained when the terminals T4, T5 and T6 are connected to the power lines, that is, in position $z$ of the controller 55''.

It is desirable to cause the motor to run in unloaded condition with the power lines connected to these terminals so that it will rotate at its highest speed during cooling in accordance with my invention. To this end the temperature responsive means TP also controls an operating coil 80 of a relay 81 having contactors 82, 83, 84, 85 and 86, respectively. The contactors 82 and 83 are connected to assure that the series-delta points of the windings will be shorted when the motor is running unloaded with the parallel-star terminal points connected, but this expedient may be omitted in certain instances. However, the contactors 84, 85 and 86 are inserted in the power lines 25', 26' and 27' to connect these power lines to the respective stationary brushes L1, L2 and L3 of the controller while the motor is operating normally with the switch TP closed, but to connect the power lines directly to the motor terminals T4, T5 and T6 in the event that the temperature responsive means TP operates upon overheating of the protected motor or of parts of the motor.

In the normal operation of the system, the operating coil 80 will remain energized so long as the temperature responsive means TP is closed and will maintain the contactors 82, 83, 84, 85 and 86 in the upper positions whereby the respective terminals of the motor and the power lines are connected to the proper stationary brushes of the controller. In any position of the controller, opening of the temperature responsive means TP deenergizes coil 80 and causes the contactors 82 and 83 to short the terminal points T1, T2 and T3 of the motor winding, and causes the contactors 84, 85 and 86 to connect the power lines directly to the high speed terminals of the motor, so that the motor will operate at its highest rated speed regardless of what speed it may have been normally operating due to the position of the controller 55''. Since opening of the temperature responsive means TP also drops the contactors 28 and 29, the motor, therefore, will operate efficiently at its aforesaid highest cooling speed in the direction in which it is unloaded, and the general purpose of my invention is thereby accomplished.

In the induction motor embodiments of Figs. 2 through 6, no provision has been depicted for performing the function of time-delay release relay 12 of Fig. 1. This omission has been deliberate to avoid complicating already complex diagrams. Nevertheless, in order to assure that the motor will be completely disconnected from the power lines in the event of continued overheating in spite of the fact that it is rotating unloaded, a time-delayed release mechanism (shown by way of illustration as a relay 12' having main line contactors 90, 91 and 92) can be connected across points A, B of Figs. 2 through 6, and may begin its timed releasing operation when the thermal protective means TP of all of the embodiments opens. After a predetermined, adjustable time the contactors will release if the thermal protective means remains open beyond a reasonable cooling time and power will, of course, be disconnected completely from the motor.

The advantages of my invention can, perhaps, be best understood from the results of a test on a two-winding, four-speed induction motor capable of running at 3600, 1800, 1200, or 600 R. P. M., the speed being selected by a manually-operated controller such as the controller 55'' of Fig. 6. The motor was protected by a thermostatic switch which opened its circuit at 85° C. and closed its circuit at 60° C. In an ambient temperature of about 23° C. the motor, deenergized and standing idle, required 47 minutes and 50 seconds to cool from the point where the thermostatic switch opened its circuit to the point where the switch reclosed. With the conditions repeated, but with the motor permitted to run unloaded, it required but 4 minutes at the highest speed, and 9 minutes 48 seconds at the next highest speed, for the motor to cool from the point where the thermostatic switch opened its circuit to the point where it reclosed.

While I have described my invention in certain specific embodiments thereof, it is obvious from the foregoing that its principles and teachings are applicable to any other suitable motor control system, and I, therefore, desire that the appended claims be given the broadest interpretation and limited only by the prior art.

I claim as my invention:

1. A protective control system for an electric motor comprising, an electric motor operative under loaded conditions or under substantially unloaded conditions, means for connecting said motor to a source of electrical energy, protective means operable in conformity to temperature conditions in said motor for protecting said motor against overheating, said protective means including means operable in accordance with motor temperatures for selecting under which of the aforesaid loaded or unloaded conditions the motor shall operate with the motor operating in said unloaded condition until the said temperature conditions protected against cease.

2. With a system for protecting an electric motor against overheating and rapidly cooling it when it approaches an undesirable temperature which comprises a motor operative under loaded condition or under a substantially unloaded condition for such cooling, power supply means therefor, and a thermally-responsive means operable in conformity to temperature conditions in said motor, the combination of means for selecting in which of said loaded or unloaded conditions the said motor shall operate, and means under the control of said thermally-responsive means for operating the selecting means to select the unloaded condition when said thermally-responsive means is above a predetermined temperature.

3. The apparatus of claim 1 with means for running said motor at a speed that is higher under substantially unloaded condition than under loaded condition.

4. The apparatus of claim 2 with means for running said motor at a speed that is higher under substantially unloaded condition than under loaded condition.

5. A system for protecting an electric motor against overheating, and rapidly cooling it when it approaches an undesirable temperature, comprising an electric motor operable under loaded or substantially unloaded conditions for such cooling, and power supply lines therefor, a thermally-responsive means operable in conformity to temperature conditions in said motor, and means operable by operation of said thermally-responsive means for causing said motor to continue to operate substantially unloaded and with ventilation.

6. In a system of the class described, in combination, an electric motor operable under loaded condition or substantially unloaded condition, means for connecting said motor to a source of electrical energy, means for selecting in which of said conditions the motor shall operate, thermally-responsive means operable in conformity to temperature conditions in said motor, means under the control of said thermally-responsive means for operating the selecting means to select the unloaded condition when the thermally-responsive means is above a predetermined temperature, and means operable by said thermally-responsive means for disconnecting said motor from said source of energy in the event that the operation of said thermally-responsive means continues for a predetermined time.

7. In a system of the type described, an electric motor having a shaft capable of rotating in one direction only, a load for said motor, power-transmitting means between said shaft and motor, said means including mechanism for connecting and disconnecting said load to said shaft, thermal protective means for said motor, and operating means for said mechanism under the control of said thermal protective means.

8. In a system of the type described, an electric motor having a shaft capable of rotating in one direction only, power-transmitting means from said shaft to a load, said means including a clutch mechanism, an electrical operating member for said clutch mechanism, thermal protective means for the motor, and an energizing circuit including said electrical operating member and thermal protective means whereby said thermal protective means controls said operating member.

9. In an electric drive for a machine tool having a working stroke and a return non-working stroke, an electric motor adapted to rotate in one direction during the working stroke and in the opposite direction during and at the end of the return stroke, connections from power supply lines for controlling the direction of rotation of said motor, limit switches operable upon said connections for reversing the direction of rotation of said motor, a thermal protective means for said motor, and including means for operating said connections to cause said motor to rotate in said opposite direction only.

10. A reversible induction motor, energy supply lines for said motor including connections to said motor for changing the direction of rotation of said motor, circuit-changing means having contacts in said connections, said connections and contacts cooperating to cause said motor to rotate in one direction with said means in one condition of operation and in the other direction with said means in a second condition of operation under which said motor operates cooler than it does with said means in said one condition of operation, and thermally-responsive means operable in conformity to temperature conditions in said motor for controlling the conditions of operation of the first said means.

11. The structure of claim 10 wherein said motor includes a series-delta, parallel-star winding, and means for shorting the delta points when said thermally-responsive means operates the first said means, upon attaining a predetermined temperature.

12. A multi-speed induction motor, energy supply lines for said motor including connections to said motor for changing the speed of rotation of said motor, circuit-changing means having contacts in said connections, said connections and contacts cooperating to cause said motor to rotate at one speed with said means in one condition of operation and at a second speed with said means in a second condition of operation under which said motor operates cooler than it does with said means in said one condition of operation, and thermally-responsive means operable in conformity to temperature conditions in said motor and controlling the conditions of operation in the first said means.

13. An induction motor having different rotational characteristics, energy supply lines for said motor including connections to said motor for changing from one characteristic of rotation to another, circuit-changing means having contacts in said connections, said connections and contacts cooperating to cause said motor to operate under one rotational characteristic with said means in one condition of operation and at a second rotational characteristic with said means in a second condition of operation under which said motor operates cooler than it does with said means in said one condition of operation, and thermally-responsive means operable in conformity to temperature conditions in said motor and controlling the conditions of operation of the first said means.

14. An induction motor having different rotational characteristics, energy supply lines for said motor including connections to said motor for changing from one characteristic of rotation to another, a relay having contacts in said connections, said connections and contacts cooperating to cause said motor to operate under one rotational characteristic with the relay in one condition of operation and at a second rotational characteristic with the relay in a second condition of operation, the motor operating cooler under said one rotational characteristic than under said second rotational characteristic, a thermal protective means for said motor and controlling the conditions of operation of said relay, and switch controller means for additionally controlling said connections for changing from one rotational characteristic to a different rotational characteristic.

15. A multi-speed reversible induction motor with a series of different rotational speed characteristics and a series of different rotational direction characteristics, energy supply lines for said motor including selectable connections for each characteristic from each of said series, a relay having different conditions to operate the motor in accordance with a characteristic of one of said series, a switch controller means for selecting said connections to operate the motor in accordance with a characteristic of the other of said series, the motor operating cooler under said certain of said characteristics as compared to other of said characteristics, and a thermal protective device means for said motor and selecting the conditions of operation of said relay.

16. The structure of claim 15 wherein said thermal protective device means also usurps control of the said other series from said controller upon said motor reaching a predetermined temperature.

17. The structure of claim 10 characterized by said motor being substantially unloaded in one of the said directions of rotation, and said thermally-responsive means controls said circuit-changing means to cause the motor to rotate in the said direction in which it is unloaded when the motor attains a predetermined temperature.

18. The structure of claim 12 characterized by said motor being substantially unloaded at one of said speeds of rotation, and said thermally-responsive means controls said circuit-changing means to cause the motor to rotate at said speed at which it is unloaded when the motor attains a predetermined temperature.

19. The structure of claim 13 in which said motor runs substantially unloaded at one of said characteristics, and said thermally-responsive means controls said relay to cause the motor to run at the last said characteristic when the motor attains an undesirable temperature.

20. The structure of claim 14 in which said motor runs substantially unloaded at one of said characteristics, and said thermal protective means controls said relay to cause the motor to run at the last said characteristic when the motor attains an undesirable temperature.

21. A multi-speed, reversible induction motor, energy supply lines therefor, a relay having contacts in said lines for reversing the direction of rotation of said motor, a second relay having contacts in said lines for changing the speed of said motor, limit switches controlling said first relay for reversing the direction of rotation of said motor, a thermal protective device for said motor controlling both said relays, and means for running said motor substantially unloaded, the last said means being also under control of said thermal protective device.

22. A two winding, three phase, multi-speed induction motor, operable in one direction under loaded condition, and in the other direction unloaded, three-phase power line for supplying power to said motor, connections including a manually-operable drum controller connected to said lines and said windings operable to different positions whereby to connect said lines to said windings in such manner as to operate said motor at different speeds, a thermal protective device means for said motor, means operable by said thermal protective device to change said connections to run said motor in said other direction, and at a higher speed.

23. The structure of claim 22 in which one of said windings is a series-star, parallel-delta, and the last said means upon operation shunts the series-delta points.

24. The system of claim 2 including means for disconnecting the power supply lines from said motor in the event that the said thermally-responsive means continues to remain at or above said predetermined temperature.

25. The system of claim 5 including means for disconnecting the power supply lines from said motor in the event that the said thermally-responsive means continues to remain at or above said predetermined temperature.

26. The system of claim 9 including means for disconnecting the power supply lines from said motor in the event that the said thermal protective means continues to remain at or above said predetermined temperature.

27. The system of claim 10 including means for connecting the power supply lines from said motor in the event that the said thermally-responsive means continues to remain at or above said predetermined temperature.

28. The system of claim 12 including means for disconnecting the power supply lines from said motor in the event that the said thermally-responsive means continues to remain at or above said predetermined temperature.

29. The system of claim 13 including means for disconnecting the power supply lines from said motor in the event that the said thermally-responsive means continues to remain at or above said predetermined temperature.

30. The system of claim 14 including means for disconnecting the power supply lines from said motor in the event that the said thermal protective means continues to remain at or above said predetermined temperature.

31. The system of claim 15 including means for disconnecting the power supply lines from said motor in the event that the said thermal protective device means continues to remain at or above said predetermined temperature.

32. The system of claim 21 including means for disconnecting the power supply lines from said motor in the event that the said thermal protective device means continues to remain at or above said predetermined temperature.

33. The system of claim 22 including means for disconnecting the power supply lines from said motor in the event that the said thermal protective device means continues to remain at or above said predetermined temperature.

34. With a system for protecting an electric motor against overheating and rapidly cooling it when it approaches an undesirable temperature which comprises, a motor continuously operative under loaded condition or a substantially unloaded condition for such cooling, power supply means therefor, and a thermally-responsive means for said motor; the combination of means for selecting in which of said conditions the said motor shall operate, and means under the control of said thermally-responsive means for operating the selecting means to select the unloaded condition when said thermally-responsive means is responsive to values indicative of a predetermined excess temperature value in said motor whereby said motor will rapidly cool by running substantially unloaded with ventilation, and to select said loaded condition when said thermally-responsive means is responsive to values below said predetermined excess temperature value.

35. A system for protecting an electric motor against overheating, and rapidly cooling the motor when it approaches an undesirable temperature, comprising a multispeed electric motor, means for connecting said motor to a source of electrical energy for loaded operation at a certain speed, thermal protective means responsive to thermal conditions in the motor, and means operable by said thermal protective means for substantially unloading the motor and for increasing the speed of the motor, whereby to effect a cooling of the motor.

36. A system for protecting an electric motor against overheating, and rapidly cooling it when it approaches an undesirable temperature, comprising a reversible electric motor, means for connecting said motor to a source of electrical energy for loaded operation in one direction and substantially unloaded in the other direction, thermal protective means responsive to thermal conditions in the motor, and means operable by said thermal protective means for reversing the motor for operation at a speed which will cool the motor.

FRANCIS J. JOHNS.